Patented Oct. 3, 1944

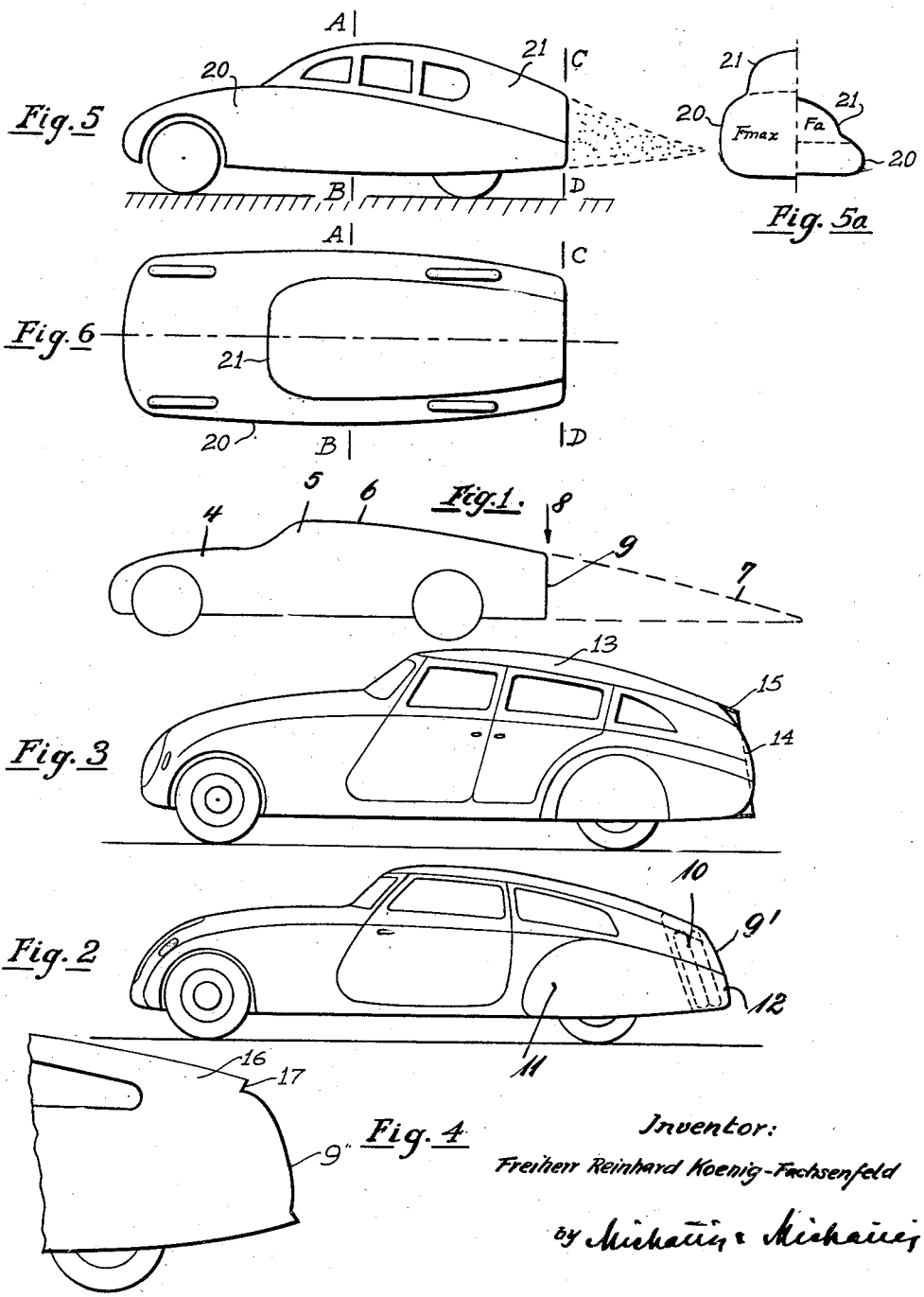

2,359,426

UNITED STATES PATENT OFFICE 2,359,426

MOTOR CAR BODY

Freiherr Reinhard Koenig-Fachsenfeld, Stuttgart, Germany; vested in the Alien Property Custodian Application April 1, 1937, Serial No. 134,265
In Germany February 17, 1936

3 Claims. (Cl. 296—1)

My invention relates to the bodies of motor cars and more especially to streamlined car bodies.

It is an object of my invention to provide a car body which creates a minimum of air resistance without the turning capacity of the car being impaired.

It is another object of my invention to provide a streamlined car body offering a larger space for the accommodation of passengers and luggage than similar bodies hitherto designed.

In the manufacture of modern motor cars the bodies have been shaped as a rule for the least possible air resistance by forming them with a taper ending, at the rear end, either in a point or in an inclined or vertical edge.

Quite especially in cars having several seats arranged side by side the width is large in proportion to the length, the ratio of length to width being for instance 2.5 or 3:1, the maximum width and height, i. e. the maximum cross section, being situated about in the middle between the two wheel axles. The overall length is limited in consideration of driving properties and space. In addition thereto the car body must not project unduly beyond the rear axle. The width of the body may for instance be 1.40 metres, the height 1.20 metres at the place of maximum cross section, the body extending for instance 1.70 metres to the rear from this point.

In view of the admissible length of the car a body answering the requirements of correct air flow cannot be made to taper, from the point of maximum cross section to a pointed end or to a horizontal or a vertical edge, so that it is not possible to obtain a sufficiently lean shape. In spite of these facts many attempts were made to obtain a kind of streamline shape of agreeable appearance by a sudden tapering of the car body which however involved considerable drawbacks, since the sudden narrowing down of the passenger space as to width and height is very inconvenient and no sufficient space is left for luggage etc. It is mainly due to these circumstances that hitherto the streamlined car has not come into wider use, the less so, since these drawbacks are not accompanied by any reduction of air resistance worth speaking of. The last mentioned type with its fictitious streamline appearance obtained by a sudden narrowing down of the car body, does not pay due regard to the real air flow alongside of the car body. For this air flow does not by any means cling to the outer surface of the rear part of the body but detaches itself from the body already near the maximum cross section and gives rise to eddies, at the same time forming a large dead air area. The final detaching and eddying is still furthered by obstacles hindering the air flow, such as the depressions surrounding the windows or the projections formed on the car body in the critical area of detachment. If it were intended to keep the air flow in continuous contact with a rear part ending in a point or edge, i. e. if a sufficiently lean streamline body shall be obtained the rear part of the car would have to be made unduly long, extending for instance several metres beyond the rear axle in a passenger car. Obviously this is impossible in a car for general use which must be short in order to possess a high turning capacity.

According to the present invention now that part of the rear part of a streamlined car body, which exceeds the utilizable and therefore practically admissible length, is cut off and a flat rear face is formed, the car body gradually tapering in a streamline shape of sufficient leanness to permit the air flow to cling to the rear part of the body without abruptly breaking off. This streamline does however not end in a point or an edge but is cut off at the point where it would exceed the length available in view of the driving properties of the car. In dependency on the desired length of the car the body is cut off at a point of larger or smaller cross section. In a longer car body the end surface thus formed will be smaller than in a car of smaller length. I thus retain the theoretically most favorable streamline shape as far as this is practically possible. The length of the streamlined portion of the car body may vary according to the requirements of the individual types of cars. The section which determines the flat end surface, may extend perpendicularly or obliquely to the longitudinal axis of the car and the rear face thus formed may also be arched or rounded off. The term "flat face" used in this specification and in the claims affixed thereto should be construed in this broad sense.

While in the known streamlined cars the air flow already detaches itself from the body near the maximum cross section, it remains in contact with the body surface of a car body according to this invention until reaching the flat rear face, so that the entire length of the car is utilized for the guiding of the air flow, which thus detaches itself at a point of considerably smaller cross section than in the known cars. This involves a considerable advantage since the cross section at which the air flow is detached, determines the unavoidable air resistance. Thus a car body according to this invention possesses a very much lower air resistance than the car bodies hitherto known.

Even with the same length the new car body provides a considerably larger inside space which may completely be utilized for storing luggage and the like. In this respect a car body formed in accordance with my invention is greatly superior to the body shapes hitherto used. If it is temporarily admissible to increase the length of the car, a luggage grid may be provided at the flat rear end. The air resistance of the car is not increased thereby provided that the luggage is arranged within the dead area. It is also possible to form a depression in the flat rear end face and to shelter spare wheels, luggage etc. in this depression.

I am further enabled to force the air flow to break off at the flat end face quickly and clearly, i. e. in a predetermined point. This is of particular importance in connection with arched, i. e. rounded or with obliquely extended end faces, in which cases I prefer to form a breaking edge at or in front of the flat end face. I may for instance take in or set off the car body so that an edge is formed which forces the air stream to break off.

In another embodiment of my invention the outer surface of the car body, instead of forming a breaking edge, may extend further to the rear without interruptions and without considering the flat end face, a guide surface being arranged at the point where the outer surface of the car body turns into the flat surface, this guide surface forming the continuation of the outer shell of the car and guiding the air flow so as to break off only at the end of this surface, i. e. at a well defined point. This guide surface, which forms a kind of cuff at the end of the car body, may be made of any desired material, for instance of transparent material in order to attract less attention.

By thus shaping the rear part of the car body and the breaking edge, I attain that the air flow retains to a certain degree the direction once imparted to it even after having been detached from the car body, i. e. even after the air flow has lost the guidance hitherto offered by the car body. I am thus enabled to guide the flow to a certain extent even after it has left the car body.

Passenger cars are already known in which the body consists of a main part and of an additional part, arranged above said main part, which is narrower than the main part and is frequently streamlined, ending in a point or an edge. Such cars may also be shaped in accordance with my invention and in this case the lower main part of the body ends in a horizontal edge while the narrower top part ends in a flat end surface. It is also possible to arrange the two parts in such manner that the main part as well as the additional part end, together in a flat end surface. Accessories such as mud-guards which are provided for practical reasons may also be shaped in the same sense as the car body formed in accordance with my invention.

It is important that the car body gradually taper from the place of the maximum cross section (which is predetermined by practical reasons) to the flat end face only to such a degree that the air flow clings closely to the entire rear part, being thus guided and breaking off only near the flat end face, whereby the total available length of the car can be fully utilized for the reduction of the air resistance.

In the drawing affixed to this specification and forming part thereof several embodiments of my invention is illustrated diagrammatically by way of example.

In the drawing

Fig. 1 is a diagrammatic side elevation of a car body according to my invention, while Fig. 2 is a more detailed view of another embodiment showing a depressed end face utilized for the accommodation of spare tyres, the rear part of the car being provided with rear mudguards.

Fig. 3 illustrates a third embodiment of my invention, while

Fig. 4 shows an end face formed with a breaking edge.

Figs. 5, 5a and 6 illustrate a side elevation, a diagram and a horizontal cross-section, respectively, of a car body made in two parts ending in a common flat end face.

Referring to the drawing and first to Fig. 1, 4 is the front part of the car body, 5 designates the driver's seat, and from this point on the car body assumes a slender streamline shape 6. From this lean form which is theoretically favorable, the rear part 7, indicated in dash lines, is cut off at the point indicated by the arrow 8. Thus the body is cut off where it would exceed the utilizable length and it here forms the flat end face 9.

In Fig. 2, 9' is the flat end face in front of which a space is provided for the accommodation of spare wheels 10 and the like, while 11 is a rear mud-guard. The mud-gards are streamlined as far as possible, that part which would exceed the practically utilizable length, being cut off and a flat end face 12 being formed.

In Fig. 3, 13 is the car body which is shaped in an aerodynamically favorable manner, but is cut off where it would exceed the practically utilizable length, ending in a flat end face 14. In order to force the air flow to break off at the flat end face, the shell of the car body may be extended, wholly or partly, beyond this end face so that a kind of guiding surface 15 is formed which causes the air flow to break off suddenly at the rear end of the guiding surface.

For the same purpose a breaking edge 17 is formed by the body near the flat end face 9'' (Fig. 4), this edge 17 improving the air flow conditions in that the flow breaks off at a well defined place instead of gradually breaking off over a more extended surface of the shell of the car body. This feature improves quite particularly the effect if rounded end faces are used.

As shown in Figs. 5, 5a and 6, the car body may be provided in two parts 20 and 21 both of which taper quite gradually toward a common flat end face. Fig. 5a is a diagram indicating, on the left hand side, the maximum cross-section Fmax of the car, while indicating, on the right hand side, the cross-section Fa at the point of break-off of the air current.

I wish it to be understood that I do not desire to be limited to the exact details of construction shown and described for obvious modifications will occur to a person skilled in the art.

I claim:

1. A vehicle, in particular, automobile body comprising a substantially flat end face, a body portion substantially corresponding to the ideal body arranged in front of said end face and adapted to guide the air current in contact with said body, and a guide surface provided as an extension for the outer walls of said body, whereby to guide the air current in contact with said body and said guide surface down to the end of the latter.

2. An automobile body comprising a substantially flat end face disposed substantially normal to the longitudinal axis of the body, and a body portion corresponding to the ideal body, the outer surfaces of said body diverging forwardly and longitudinally from a bend line forming the perimeter of said end face, whereby the ideal body will be abruptly terminated at the junction of said end face with said ideal body surfaces, said ideal body being adapted to guide the air currents in contact with said body surfaces up to said bend line where the flat end face is located.

3. An automobile body comprising a rear portion having converging outer surfaces substantially corresponding to that of the ideal body, said outer surfaces terminating in a plane disposed substantially normal to the longitudinal axis of the body thereby forming an edge, a substantially flat end face having flanges diverging outwardly from the perimeter thereof and projecting forwardly of the body, said end face being disposed substantially parallel to said plane, a plate member projecting forwardly of said body and inwardly from said surface edge, the forwardly projecting edge of said plate being connected to the forward edge of said flanges to form a re-entrant groove for separating said edge of termination of the ideal outer body surfaces and said end face, the ideal body portion being adapted to guide the air currents in contact with the body surfaces up to said first-named edge.

FREIHERR REINHARD
KOENIG-FACHSENFELD.